United States Patent
Xu et al.

(10) Patent No.: US 9,304,738 B1
(45) Date of Patent: Apr. 5, 2016

(54) SYSTEMS AND METHODS FOR SELECTING CONTENT USING WEIGHTED TERMS

(75) Inventors: Jinjun Xu, Los Angeles, CA (US); Kai Chen, Santa Monica, CA (US); William David Reardon, Santa Monica, CA (US)

(73) Assignee: Goolge Inc., Mountain View, CA (US)

( * ) Notice: Subject to any disclaimer, the term of this patent is extended or adjusted under 35 U.S.C. 154(b) by 250 days.

(21) Appl. No.: 13/523,625

(22) Filed: Jun. 14, 2012

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)

(58) Field of Classification Search
CPC .................... G06F 17/30867; G06F 17/30864; G06F 17/3053
See application file for complete search history.

(56) References Cited

U.S. PATENT DOCUMENTS

| | | | |
|---|---|---|---|
| 7,685,197 B2 * | 3/2010 | Fain et al. | 707/732 |
| 7,987,194 B1 | 7/2011 | Walker et al. | |
| 8,166,046 B1 * | 4/2012 | Krikheli et al. | 707/748 |
| 8,176,046 B2 * | 5/2012 | Druzgalski et al. | 707/731 |
| 2002/0120505 A1 * | 8/2002 | Henkin et al. | 705/14 |
| 2005/0033771 A1 * | 2/2005 | Schmitter et al. | 707/104.1 |
| 2005/0091111 A1 * | 4/2005 | Green et al. | 705/14 |
| 2006/0287920 A1 * | 12/2006 | Perkins et al. | 705/14 |
| 2007/0288433 A1 * | 12/2007 | Gupta | G06F 17/30663 |
| 2009/0234811 A1 * | 9/2009 | Jamil | G06F 17/30867 |
| 2009/0265415 A1 | 10/2009 | Harry | |
| 2010/0076965 A1 * | 3/2010 | Kamada et al. | 707/728 |
| 2010/0223215 A1 * | 9/2010 | Karypis et al. | 706/12 |
| 2010/0325130 A1 * | 12/2010 | Baldwin et al. | 707/759 |
| 2011/0078167 A1 * | 3/2011 | Sundaresan et al. | 707/765 |
| 2011/0145066 A1 * | 6/2011 | Law et al. | 705/14.54 |
| 2011/0264507 A1 | 10/2011 | Zhou et al. | |
| 2011/0302172 A1 * | 12/2011 | Chandrasekar et al. | 707/748 |
| 2012/0089621 A1 * | 4/2012 | Liu et al. | 707/749 |
| 2012/0330977 A1 * | 12/2012 | Inagaki | 707/749 |
| 2013/0159506 A1 * | 6/2013 | Stern et al. | 709/224 |
| 2013/0246184 A1 * | 9/2013 | Flood | G06Q 30/02 705/14.66 |

* cited by examiner

*Primary Examiner* — Tuan A Pham
(74) *Attorney, Agent, or Firm* — Foley & Lardner LLP; John D. Lanza; James De Vellis (57) ABSTRACT

Systems and methods for evaluating information via a computer network using weighted terms are provided. A data processing system can detect an indication of user interest in subject matter of an information resource, and can identify a plurality of keywords associated with the subject matter. The data processing system can determine a weight for each of the plurality of keywords for the information resource. The data processing system can receive a request for content to provide for display with the information resource, and can evaluate the weight of each of the plurality of keywords associated with the information resource to determine one or more keywords to use for content selection. The data processing system can select content to provide for display with the information resource based at least in part on the selected keyword(s) or the weight associated with the selected keyword(s).

19 Claims, 4 Drawing Sheets

SYSTEMS AND METHODS FOR SELECTING CONTENT USING WEIGHTED TERMS

BACKGROUND

In a networked environment such as the internet, entities such as people or companies provide information for public display on web pages or other documents. The web pages can include text, video, or audio information provided by the entities via a web page server for display on the internet. Additional content can also be provided by third parties for display on the web pages together with the information provided by the entities. Thus, a person viewing a web page can access the information that is the subject of the web page, as well as third party content that may appear with the web page.

SUMMARY

At least one aspect is directed to a computer implemented method of evaluating information via a computer network. The method can include a data processing system that detects user interest in subject matter of an information resource, and can identify a plurality of keywords associated with the subject matter. The method can determine, for the information resource, a weight of each of the plurality of keywords based on the user interest in the subject matter. The method can receive a request for content to provide for display with the information resource, and can evaluate the weight of each of the plurality of keywords to select a selected keyword. The method can select a selected content to provide for display with the information resource based at least in part on the selected keyword.

At least one aspect is directed to a system of evaluating information via a computer network. The system can include a data processing system having at least one of a weighting circuit and a content selector circuit. The data processing system can detect user interest in subject matter of an information resource, and can identify a plurality of keywords associated with the subject matter. The data processing system can determine, for the information resource, a weight of each of the plurality of keywords based on the user interest in the subject matter. The data processing system can receive a request for content to provide for display with the information resource, and can evaluate the weight of each of the plurality of keywords to select a selected keyword. The data processing system can select content to provide for display with the information resource based at least in part on the selected keyword.

At least one aspect is directed to a computer readable storage medium having instructions to evaluate information. The instructions can include instructions to detect user interest in subject matter of an information resource, and instructions to identify a plurality of keywords associated with the subject matter. The instructions can include instructions to determine, for the information resource, a weight of each of the plurality of keywords based on the user interest in the subject matter. The instructions can include instructions to receive a request for content to provide for display with the information resource, and instructions to select a selected keyword based on the weight of the plurality of keywords. The instructions can include instructions to select a selected content to provide for display with the information resource based at least in part on the selected keyword.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Some implementations of the disclosure are directed to systems and methods of content selection by weighting keywords to differentiate among keywords associated with content. The most heavily weighted keywords can be used to select content, for display on a web page, as content associated with the most heavily weighted keywords can be most likely to be clicked. The weights can be web page specific. For example, weights can be assigned to keywords (or other placement criteria) based on the use of the keywords for content placed on an identified web page. The weight or score of the keyword for a particular web page can be generated based on the keywords' historical performance on that web page. For example, systems and methods of the invention can analyze historic content interaction activity on a web page to determine which keywords generated more clicks or conversions on that web page.

In some implementations, a user visits a web page having one or more content. The ads can be associated with one or more keywords. Different ads can share one or more common keywords. A data processing system (e.g., ad server) can receive an indication of user interest with respect to one of the ads on the web page. For example, the user may click on the ad. The data processing system can detect the click, and weight (e.g., adds a point to a score of) the keyword associated with that ad. This process can be repeated for that web page a number of times for different users until, for example, the data processing server has a statistically significant amount of information regarding which ads have been clicked, and which keywords are associated with the clicked ads. The weight assigned to the keyword generally reflects how frequently that keyword is associated with content of a web page that is clicked on by a user viewing that web page.

The data processing system can determine weights for keywords associated with ads (or other content) displayed on a web page. For example, a weight (or score) of zero for a keyword on a web page can indicate that ads displayed on the web page having the keyword were not clicked on, at least during a time period under evaluation. A weight of 10 may indicate that the keyword is associated with one or more ads appearing on the web page that were clicked a total of ten times. Thus, the data processing system can weigh one or more ad keywords based on the historical performance of the keyword on an identified web page.

For example, a first user may visit a news web page having content about insurance, video games, and cars. The insurance content in this example can be associated with the keywords "car" "auto" and "home", the video game content can be associated with the keywords "car" "sports" and "racing", and the cars content can be associated with the keywords "car" "sedan" and "commute". The data processing system can determine that the first user clicks on the insurance content, the second user clicks on the video games content, and the third user also clicks on the insurance content. Since the keyword "car" is associated with all three clicks, it will get three points; keywords "auto" and "home" get two points; keywords "online" and "racing" get one point; and keywords "sedan" and "commute" get zero points because their associated ads were not clicked on in this example. Thus, when the fourth user visits the web page, the data processing system can select an ad based on the weight assigned to the keywords. In this example, if the ad request is for the top two content, the ad server may serve the insurance content and the video games content because they are associated with the highest weighted keywords for that web page.

The data processing system can provide content for display with any information resource, such as a web page, web site, domain name, or uniform resource locator. In one implementation, ads are provided to a parked domain based on weighted keywords. For example, historical activity such as click through rates of content on parked domains can be analyzed. A parked domain can display several content. When an ad displayed on a parked domain is clicked on, the keywords of that ad are analyzed and assigned a point (or other weighing metric). The keywords of those content on the parked domain can be ranked based on their point total, for example. For subsequent activity, the data processing system can provide content that include the highest ranked keywords for that parked domain. In this example, the ranking is specific to the parked domain, which generally has no substantive content other than content provided by a content placement server. Thus, the data processing system can determine the most effective keywords for a particular parked domain and can provide content having those keywords.

Figure 1:
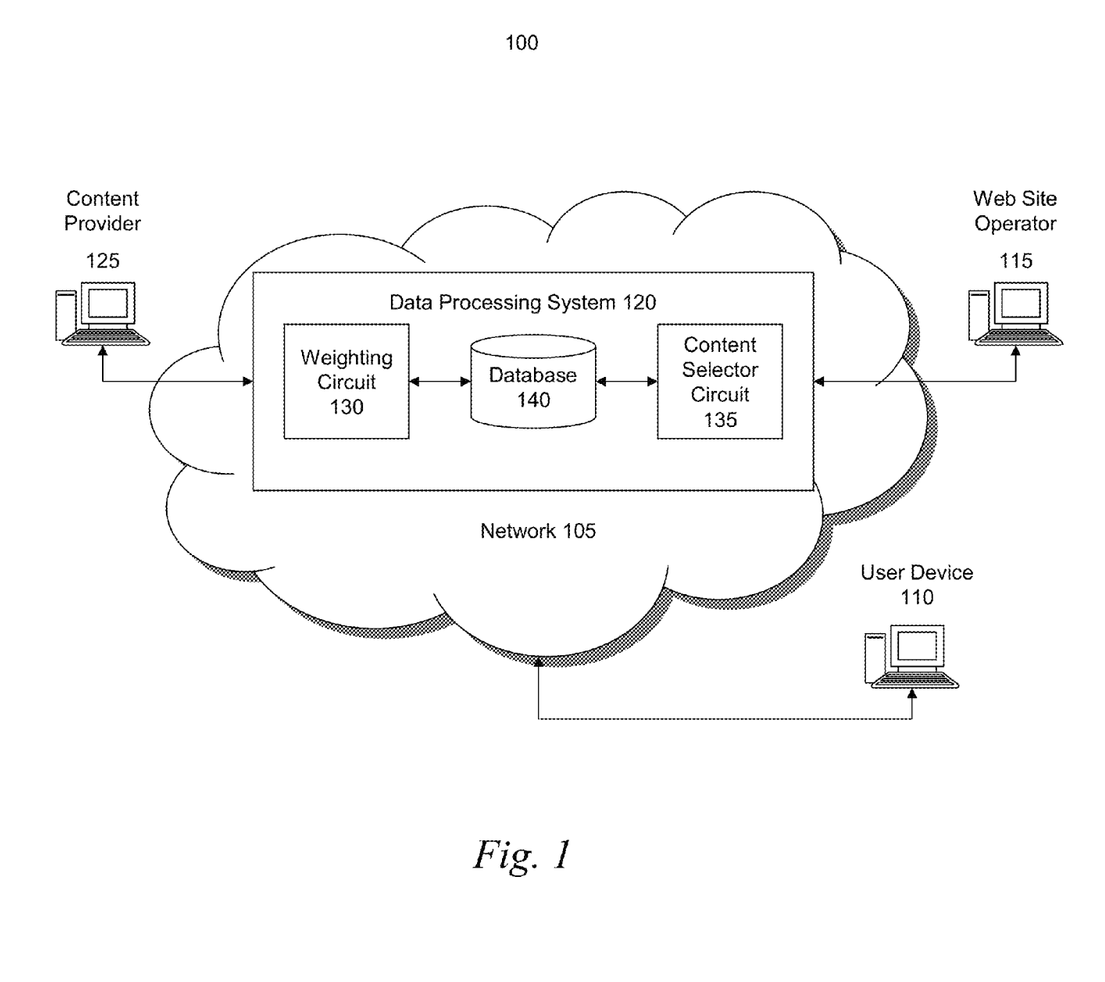
FIG. 1 is an illustration of an example system of evaluating information via a computer network in accordance with an implementation.

FIG. 1 illustrates an example system 100 of evaluating information via a computer network such as network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, or portable computers. For example, via the network 105 a user of the user device 110 can access web pages provided by at least one web site operator 115. In this example, a web browser of the user device 110 can access a web server of the web site operator 115 to retrieve a web page for display on a monitor of the user device 110. The web site operator 115 generally includes an entity that operates the web page. In one implementation, the web site operator 115 includes at least one web page server that communicates with the network 105 to make the web page available to the user device 110.

The system 100 can include at least one data processing system 120. The data processing system 120 can include at least one logic device such as a computing device having a processor to communicate via the network 105, for example with the user device 110, the web site operator 115, and at least one content provider 125. The data processing system 120 can include at least one server. For example, the data processing system 120 can include a plurality of servers located in at least one data center. In one implementation, the data processing system 120 includes a content placement system having at least one server. The data processing system 120 can also include at least one weighting circuit 130, at least one content selector circuit 135, and at least one database 140. The weighting circuit 130 and the content selector circuit 135 can each include at least one processing unit or other logic device such as programmable logic arrays or application specific integrated circuits configured to communicate with the database 140. The weighting circuit 130 and the content selector circuit 135 can be separate components, a single component, or part of the data processing system 120.

In some implementations, the data processing system 120 detects user interest in subject matter of an information resource. The user may interact with the subject matter via user device 110. The data processing system 120 may detect the user interest by receiving an indication about the user interaction with the subject matter via network 105. Subject matter may include, e.g., online content, images, text, multimedia, news articles, and blogs. An information resource may include online information resources accessible via network 105 including, e.g., a web page, web site, uniform resource locator ("URL"), or a domain name. For example, a web site may be a set of related web pages containing content (media) such as text, images, video, audio, etc. In some implementations, the information resource may be one or more levels of a domain name, e.g., a subdomain of a top-level domain.

The data processing system 120 may determine user interest based on the type or amount of user interaction with the subject matter. For example, a user may not be interested in subject matter of the information resource, may be highly interested in the subject matter, or have any other intermediate interest level in the subject matter. Types of user interaction that indicate user interest in web page or other information resource subject matter may include viewing the subject matter or an impression, a click, a selection, a finger gesture, a mouse over, a conversion, completing a survey, or performing any other action desired by the content provider with respect to the subject matter or information resource. In some implementations, the subject matter may explicitly prompt a user for a level of interest in the subject matter. For example, the subject matter may include a link to a web page that prompts the user to vote, input information, rate their interest on a scale of 1 to 10, or otherwise indicate, via a user interface, their interest in the subject matter. The data processing system 120 can obtain this information and evaluate it to determine the level of interest in the subject matter. In some implementations, data processing system 120 may determine that a conversion occurred if online content prompted or otherwise directed a user to open an account, complete a survey, or purchase a product, and the user proceeded to take one or more action desired by the content provider 125.

In some implementations, the data processing system 120 may identify at least one keyword associated with the subject matter. Keywords may include, e.g., text, characters, numbers, terms, string of terms, words, phrases, concepts, topics, proper nouns, or index operators. The data processing system 120 may identify keywords associated with the subject matter by sending a query to database 140 or other content repository. For example, the database 140 may be structured so that subject matter is stored with associated keywords. In another example, keywords may include an identifier that identifies associated subject matter. In another example, a content provider 125 may provide keywords associated with subject matter upon request. In some implementations, the data processing system 120 determines one or more keywords for the subject matter based on the text or content of the subject matter.

In some implementations, the plurality of keywords may include a first keyword associated with first subject matter of the information resource and a second keyword associated with second subject matter of the information resource. For example, a web page may include multiple content. Each content may be associated with one or more keywords. In some implementations, multiple content may be associated with one or more of the same keywords. For example, a web page may include two content slots where the first content slot displays content for a new car and the second content slot displays content for car insurance. Each content may be associated with keywords "car", "auto", and "vehicle". The first content may further be associated with keywords "new car", and "buy". The second content may further be associated with keywords "insurance", "collision", and "coverage".

In some implementations, the data processing system 120 may determine, for the information resource, a weight of each keyword based on the user interest in the subject matter. For example, the data processing system 120 may include a weighting circuit 130 that includes a processor or other logic device configured to determine a weight for a keyword or a term. The weight may be a numeric score, point, letter, grade, color, or other indication of how well a term matches a web page. For example, the weight can indicate a likelihood that a user of an identified web page will be interested in content associated with the term when that content appears on the identified web page, or how well a term has performed on the identified web page. For example, the weighting circuit 130 may add a point to the weight of a term if a user interacted with or accessed the content with which the term is associated. The weighting circuit 130 may determine (e.g., by retrieving data from the database 140) that a term has a weight of 1 for a specific web page. The weighting circuit 130 may further determine to add a point to the term's weight based on the user's interest with content associated with the term. In some implementations, the weight may be proportional to the click through rate, conversion rate, total clicks, or total revenues generated. In some implementations, the weight may be normalized so that it can be merged with terms from other content selection sources. For example, the weight may be proportional with or related to the number of clicks per thousand impressions, i.e., the number of times a user clicked on or otherwise accessed or interacted with content for every 1000 times the content was selected for display on one or more web pages.

In some implementations, the weighting circuit 130 determines a weight for a keyword that includes one or more terms. The weight can be determined for the keyword as a whole, or for the individual terms of the keyword. For example, a keyword may be the phrase "auto insurance" and the terms of the keyword may be "auto" and "insurance". The weighting circuit 130 can determine a weight for the keyword "auto insurance", or a weight for the individual term "auto" and a weight for the term "insurance", where the weights may be the same or different.

The weighting circuit 130 can determine a weight for a keyword based on historic performance of the keyword on an identified information resource. The weight or historic performance may be specific to an information resource. For example, a keyword may be assigned weight X when it is associated with web site www.example1.com, and the same keyword may be assigned weight Y when it associated with web site www.example2.com. The historic performance of a keyword or term may refer to the user's interest in online content associated with the keyword or term. In some implementations, the weighting circuit 130 determines a weight by analyzing a content log that includes historic performance data. A user's interest in a keyword or term may be based on a plurality of factors, including, e.g., receiving an indication of user interest such as whether the user accessed or interacted with the online content.

In some implementations, the data processing system 120 determines the weight for a keyword based on a characteristic associated with the user interest in the subject matter of the information resource. The characteristic may include, e.g., temporal characteristics such as a day of the week, month, or year, time of day, etc. For example, the weighting circuit 130 may determine that an interaction with a content at a certain time of day should be given more or less weight. In some implementations, the characteristic may be a characteristic of a content slot on the web page. For example, weighting circuit 130 may determine that an interaction with content that is displayed on a certain part of a web page, e.g., at the top or bottom of the web page, should be given more or less weight.

The characteristic associated with the user interest may be monetary, e.g., based on the amount the content provider 125 bid on the keyword associated with the content. For example, a plurality of content providers 125 may bid on a keyword in order to increase the likelihood that certain content may be selected for display on a web page. For example, a first content provider 125 may bid $1 for keyword "car" and a second content provider 125 may bid $2 for the same keyword. The data processing system 120 may be more likely to select content of the second content provider 125 if, for example, all other content selection criteria and factors are constant among the two content providers 125. In some implementations, the weighting circuit 130 assigns a weight based on the number of bids on the keyword, the amount of the maximum bid, the total amount of bids, or other criteria based on bids.

In some implementations, the weighting circuit 130 may determine to add one or more points to a keyword or other term based on the level of user interest with the content associated with the term. The weighting circuit 130 may also add or subtract one or more points from the weight of a term based on historic performance of the term. For example, the weighting circuit 130 may determine that users are not interested in a term and, accordingly, decrease a weight associated with the term. In some implementations, the weighting circuit 130 may determine the weight for the term based on a timestamp of when the weight of the term was last modified or one or more timestamps of one or more previous modification to the weight of the term. For example, the weight for a term on a specific web page may have rapidly increased in a short period of time. Thereafter, the data processing system 120 may determine that no user has shown any interest in the term for a certain period of time. The data processing system 120 may then determine that the heavy weight for the term is an anomaly and, accordingly, reduce the weight of the term in order to select content that a user of a specific web page is more likely to be interested in.

In some implementations, the data processing system 120 receives a request for content to provide for display with the information resource. The information resource may request the content. For example, a content publisher or web page operator may transmit a request for content via network 105. In some implementations, the request for content may be real-time. For example, the web page operator may transmit a request for content to the data processing system 120 in response to receiving a request to display content of the information resource to a user device 110.

The request for content can include information about the content request. Content request information may include properties or attributes associated with the information resource, including, e.g., size and position of the display slot, keywords of the information resource, and an identifier associated with the information resource (e.g., a URL or other unique identifier). In some implementations, The request for content can include one or more keywords, contents of a web page, hints, and other information about the web page, user, or content being requested. The request for content may include weights for keywords for the web page.

In some implementations, the content request includes keywords and a uniform resource locator ("URL") associated with the web page making the request for content, and not include corresponding weights. The content selector circuit 135 may determine one or more terms based on the keywords and determine weights, if they exist, for the terms based on stored information about the terms and the URL in the database 140. For example, the database 140 may include current weighting information for a keyword for a specific web page.

In some implementations, the data processing system 120 evaluates the weight of each of the plurality of keywords to select a selected keyword. The data processing system 120 may retrieve the weight assigned to a keyword from database 140. In some implementations, the data processing system 120 may receive the weight assigned to a keyword via the request for content from the information resource. In some implementations, the data processing system 120 may determine a weight for a keyword upon receiving a request for content. For example, the data processing system 120 may determine that the keyword has not been associated with content for which a user has indicated an interest and assign the keyword a baseline weight, e.g., zero.

The data processing system 120 can evaluate the weights multiple ways to select a keyword. The data processing system 120 may select the keyword associated with the highest weight. In some implementations, the data processing system 120 may evaluate the weights to determine a statistic associated with the weights to select a keyword. For example, the data processing system 120 may evaluate the weights to determine the keyword associated with the highest average weight during a period of time (e.g., in the past 24 hours, 7 days, 30 days, or triggered on some other event such as the launch of the information resource, subject matter, etc.). In another example, the data processing system 120 may evaluate the weights to determine the keyword whose weight increased the fastest during a period of time.

In some implementations, the data processing system 120 ranks, for the information resource, the plurality of keywords based on the weight of each of the plurality of keywords. For example, keywords associated with higher weights may be ranked higher than keywords associated with lower weights. If multiple keywords are associated with the same weight, then they may have the same rank. In some implementations, keywords associated with the same weight may be further ranked based on a statistical analysis or other characteristic. The data processing system 120 may select a keyword to be the top ranking keyword based in part on the statistical analysis.

In some implementations, the data processing system 120 selects a keyword based on received indications of user interest in multiple pieces of subject matter of a web page. For example, a web page may include a first subject matter and a second subject matter that are each associated with one or more keywords. The data processing system 120 may receive an indication of user interest in the first and second subject matter and determine a weight for keywords associated with the first subject and matter and keywords associated with the second subject matter. For example, a first user may indicate an interest in the first subject matter and a second user may indicate interest in the second subject matter. In another example, a first user may indicate an interest in the first subject matter at a first time, and indicate an interest in the second subject matter at a second time. In some implementations, the first and second time may correspond to one user session, e.g., the first and second subject may concurrently be on display on the web page. The user may indicate an interest in the first subject matter and then indicate an interest in the second subject matter. The data processing system 120 may evaluate the weights of the keywords associated with the first and second subject matter to identify one of the keywords associated with the first subject matter and/or the second subject matter as the selected keyword.

In some implementations, the weighting circuit 130 selects multiple selected keywords. For example, the weighting circuit 130 may rank the keywords and select the top ranking keywords (e.g., top 3 keywords, top 5 keywords, top 10 keywords, etc.). The weighting circuit 130 may select multiple keywords based on a statistical approach or any other evaluation or combination of evaluations. For example, the weighting circuit 130 may select a first keyword with the highest weight, a second keyword with the second highest weight, a third keyword with the highest average weight over a period of time, a fourth keyword with the fastest rate of weight increase over a period time, and a fifth keyword with the highest bid amount. Continuing with this example, the data processing system 120 can select any of these keywords as a highest ranking keyword used to identify content for display with an information resource.

In an illustrative example of an implementation, a user may visit a news web page that includes ads associated with one or more keywords. Different ads can be associated with the same keyword(s). The data processing system 120 may receive an indication of user interest with respect to one of the ads on the web page. For example, the user may click on the ad. Based on the click, the weighting circuit 130 weights (e.g., adds a point to a score of) the keywords or terms associated with that content. For example, a term may not be associated with a weight for the identified web page prior to a user clicking on the ad on display on the identified web page. After a user clicks on the ad on the identified web page, the weighting circuit 130 may add one point to the weight of the term for the identified web page. This process can be repeated for that web page a number of times for different users until, for example, the data processing system 120 has a statistically significant amount of information regarding which ads have been clicked, and which terms are associated with the clicked ads. Thus, the data processing system 120 weighs one or more ad terms based on the historical performance of the term on an identified web page. The weight assigned to the keyword reflects how frequently that keyword is associated with content of a web page that is clicked on by a user viewing that web page.

In one implementation, the data processing system 120 can represent the weight of the keywords as indicated by the pseudo-code: weighted_terms {term: "computer monitor" weight: 400}; weighted_terms {term: "wii game" weight: 200}; weighted_term {term: "toys" weight: 50}. In one implementation, web page operator 115 may store information about weighted terms and include weighted keywords in a request for content from a data processing system 120. These example weights may be added to other weighting or content selection criteria. For example, the data processing system 120 may determine a weight for a keyword based on the frequency of occurrence of the keyword in the text of the web page or other information resource. For example, if the keyword "toys" appears 10 times in the text of the web page, the data processing system may add the frequency score "10" to the weight "50" to determine an overall weight of the keyword "toys" of 60. In some implementations, weight based on frequency, as opposed to performance or importance, may have a different multiplier. For example, the multiplier for frequency of occurrence may be 10 whereas the multiplier for performance may be 100. Further to this example, if a keyword appears in the text of a web page 10 times, the weight of the keyword attributed to frequency may be 100, whereas if one or more content associated with the keyword was selected by a user 10 times, the weight associated with the keyword may be 1000. Further to this example, the overall weight of the keyword may be a sum of the weight attributed to frequency and the weight attributed to performance or importance (e.g., 100+1000=1100).

In some implementations, the weighting circuit 130 determines a weight offline, i.e., prior to content serving time. Content serving time may refer to a time period when a content publisher (e.g., web site owner) makes a request for content in response to a user making a request for access to the web page of the content publisher. In some implementations, the data processing system 120 determines weights offline, stores the weight in a database 140 and retrieves the weight at a later time (e.g., in response to a request for content from a web page operator) to identify ads or other content for display with the web page.

In some implementations, the data processing system 120 selects a selected content to provide for display with the information resource based at least in part on the selected keyword. The data processing system 120 may include a content selector circuit 135 configured to select the selected content. The content selector circuit 135 selects the content to display based on one or more factors, including, e.g., keyword weights, bidding, and historical performance.

The content selector circuit 135 may select content to provide to a specific information resource if terms associated with the content are more heavily weighted for the specific information resource. For example, content one may be associated with three terms that each have a weight of 10 and content two (e.g., a different content) may be associated with one term that has a weight of 20 and two terms that have a weight of zero. In some implementations, the content selector circuit 135 may select the content that has the highest sum of weights, e.g., content one with a total weight of 30 in this example. In some implementations, the content selector circuit 135 may select the content with the maximum individual term weight, which would be content two with a maximum term weight of 20.

In some implementations, the content selector circuit 135 may use the terms and weights as one of a plurality of factors in selecting content. The weighted terms may have a small or large affect on whether certain content is selected for display on a web page. For example, the content selector circuit 135 may identify content associated with top ranking terms or otherwise use the top ranking terms for content selection. Top ranking terms may include the terms with the highest weights for a specific web page. In some implementations, the content selector circuit 135 may determine that top ranking terms are those terms that have weights beyond a predetermined threshold weight. The threshold may be based on a plurality of factors, including one or more factors set by a web page operator or a content provider 125. In some implementations, the content selector circuit 135 determines top ranking terms to be those terms that are the top n most heavily weighted terms, where "n" indicates the number of desired top terms (e.g., a positive integer). In some implementations, the content selector circuit 135 identifies content based on the top ranking term, e.g., where n is equal to 1.

In some implementations, the content selector circuit 135 can select a content that is associated with a first selected keyword and a second selected keyword. For example, the data processing system 120 may select two selected keywords to be used in content selection. The content selector circuit 135 may transmit the keywords to a data processing system 120 (e.g., a content selection server or content placement server) via network 105. In some implementations, the content selector circuit 135 uses the selected keywords to filter a subset of content that is eligible for display on the information resource. For example, the content selector circuit 135 may retrieve a plurality of content that is associated with one or both of the selected keywords. The content selector keyword 135 may rank the selected content to determine the content with the highest sum of keyword weights. For example, content associated with both selected keywords may have a higher content weight than content associated with one of the selected keywords. In one example, the content selector 135 may select the highest weighted content for display. In another example, the content selector 135 may submit the one or more highest weighted content to a content selection server that selects one of the one or more highest weighted content. The content selector 135 or content selection server may select content for display based on bid amounts, historical performance, or any other factor.

In some implementations, the data processing system 120 selects a plurality of selected content that have the selected keyword. For example, the data processing system 120 may select multiple items of content when the content request is for multiple content. For example, the content request may be for two content slots on a web page. The content selector 135 may determine that there are two contents that include the selected keyword and are otherwise weighted similarly. The content selector 135 may select both content for display on the web page. In some implementations, the content selector circuit 135 may transmit or otherwise convey the selected content to a content placement server that may select one or more of the selected content based on a plurality of other factors. The content placement server may be part of the data processing system 120 or an external component.

In some implementations, the data processing system 120 receives an indication of user interest in subject matter associated with selected keywords. The subject matter on display on the information resource may have been selected by the data processing system 120 based on the selected keywords. The selected keywords may be assigned a weight and be associated with historical performance of the information resource. The data processing system 120 may determine a weight for the selected keywords in response to receiving the indication of user interest. For example, the data processing system 120 may facilitate a feedback loop where the selected keyword is used to select the content for display, the data processing system 120 subsequently detects an indication of user interest in the selected content, and then the data processing system 120 may increases the weight of the selected keyword.

The database 140 can include information to facilitate content selection or other function of the data processing system 120. The database 140 can categorize information in various ways. In some implementations, the database 140 can associate terms with a unique identifier that identifies a web page URL. The unique identifier of the web page may be the web page URL or it may be another unique identifier that includes one or more characters, letters, numbers, symbols, etc. The database 140 may further include historic information about a term in addition to the current weight of the term. For example, the database 140 may include a timestamp for each time the weight of a term was modified.

Figure 2:
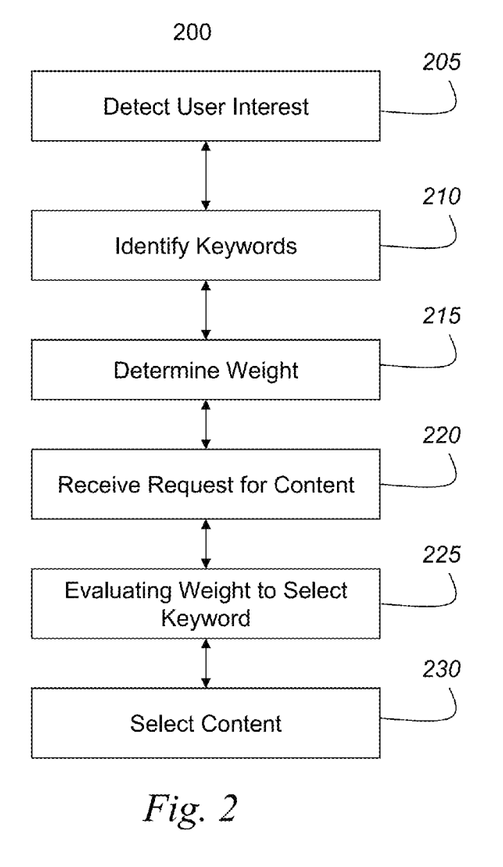
FIG. 2 is a flow chart illustrating an example method of evaluating information via a computer network in accordance with an implementation.

FIG. 2 is a flow chart illustrating an example method 200 for evaluating information via a computer network using weighted terms. In some implementations, the method 200 obtains an indication of user interest in content (BLOCK 205). The method 200 may obtain the indication via a user interface. The indication of user interest may include the user accessing or interacting with online content. For example, the indication may include the user clicking or selecting online content, providing input, responding to a prompt for input, or otherwise accessing or interacting with the online content in a manner desired by the content provider. In some implementations, the received indication of user interest (BLOCK 205) may include a mouse over, a conversion, or a finger gesture.

In some implementations, the method 200 identifies keywords or terms associated with online content for which the method 200 obtained an indication of user interest (BLOCK 210). In some implementations, the method 200 includes identifying keywords or terms associated with a plurality of content, regardless of whether the method obtained an indication of user interest. The method 200 may identify one or more keywords associated with online content in order to identify one or more terms that make up the keyword. For example, the method 200 may identify the keyword "auto insurance" and further determine that the keyword comprises the terms "auto" and "insurance".

In some implementations, the method 200 may receive one or more keywords or terms associated with online content (BLOCK 210). In some implementations, the data processing system receives keywords or terms (BLOCK 210) along with content that is received from a content provider. The method 200 can receive the keyword prior to or after receiving content from a content provider. In some implementations, the method 200 receives keywords (BLOCK 210) from a keyword repository. The method 200 may receive a unique identifier for the content and determine keywords associated with the content. For example, the method 200 may determine associated keywords by retrieving information from a database.

In some implementations, the method 200 may determine a weight for one or more keywords or terms (BLOCK 215). For example, a weight may be determined by obtaining weighting information from a database (BLOCK 215). The weight of the term may be modified. For example, based on the indication of user interest (BLOCK 205), the method 200 may add a point to the weight of a term (BLOCK 215) identified at BLOCK 210. For example, content for auto insurance may have the following keywords: "auto insurance", "car", "safety", "purchase", "automobile", and "registration". The method 200 may determine that each term has a weight of zero, and add a point to the weight of each term (e.g., "auto", "insurance", "car", "safety", "purchase", "automobile", and "registration") if the method 200 obtained an indication of user interest in the auto insurance content. Thus, the weight of each term associated with the auto insurance content and the specific web page is one, in this example. In another example, the term "car" may previously have a weight of 5, in which case the determined weight of the term "car" may be adjusted to have a weight of six.

The method 200 can receive a request for subject matter (e.g., content) (BLOCK 220). The request for content may be received by the data processing system from a web page operator or content publisher via the network 105. The request for content may be further received in response to a user of a user device 110 requesting access to a web page of the web page operator. The content request may be for content, text, multimedia, images, or audio, for example.

In some implementations, the method 200 evaluates the weight of each of a plurality of keywords or terms associated with the web page to select a selected keyword or term (BLOCK 225). The plurality of keywords or terms associated with the web page can include keywords or terms associated with content displayed on the web page. For example, the plurality of keywords or terms associated with the web page may include the keywords or terms associated with content displayed on the web page within a determined time period (e.g., last 30 days, last 24 hours, last six months, or the entire duration for which data exists in the database).

In some implementations, the method 200 evaluates the weight of each of the plurality of terms by determining that one or more terms are above a threshold weight. The threshold weight may be set by a data processing system, content provider, or web page operator. The threshold may be a fixed, predetermined value or the threshold may be a formula based on one or more factors. For example, the threshold weight may be based on the average weight of all terms. For example, there may be 10 terms associated with a web page with weights: 1, 3, 5, 7, 9, 11, 13, 15, 17, and 19. The method 200 may include evaluating the weights to determine all terms that have a weight above the average weight, which would be all terms with a weight above 10, in this example.

In some implementations, the method 200 may evaluate the weights of all terms associated with the web page to determine the top n most heavily weighted terms, where "n" is a positive integer. For example, the method 200 may evaluate the weights to determine the top five terms associated with the web page. In some implementations, the method 200 can evaluate the weights based on a timestamps or other temporal aspect. For example, the method 200 may evaluate the weights to determine which terms associated with the web page have increased in weight most rapidly in the last 30 days (or 24 hours, or 7 days, or other duration of time). For example, the method 200 may evaluate the weights to determine one or more terms that increased the most rapidly in the last 24 hours and use one or more of those terms to select content, for display with the information resource.

In some implementations, the method 200 selects content for display on the web page using weighted terms (BLOCK 230). In some implementations, the method 200 may select keywords or other terms (BLOCK 230) based on the weighting evaluation (BLOCK 225). For example, the data processing system may select the top ranking terms (e.g., most heavily weighted terms) and use them for content selection (BLOCK 230). In some implementations, the method 200 identifies one or more items of content that are associated with the selected terms. The content can be selected based on a plurality of factors, where one of the factors includes the weighted terms. For example, the method 200 may filter out all content associated with top ranking terms and then apply one or more other content selection criteria to ultimately select a content for display on the web page. For example, in contextual content selection, the method 200 may further match the content to be selected with the content of the web page to determine relevancy. In another example, the method 200 may further match content to user preferences or web page operator preferences.

Upon selecting a content, in some implementations, selected content is retrieved by the data processing system (BLOCK 230) from a content repository and the content is provided via a network to a web page operator for display to a user of a user device. In some implementations, the method 200 may select one or more content (BLOCK 230) pursuant to a request for content made by a web page operator. For example, the web page operator may request one content for a content slot on the web page. In some implementations, the method 200 scores content to determine a top ranking content to provide for display on the web page.

Figure 3:
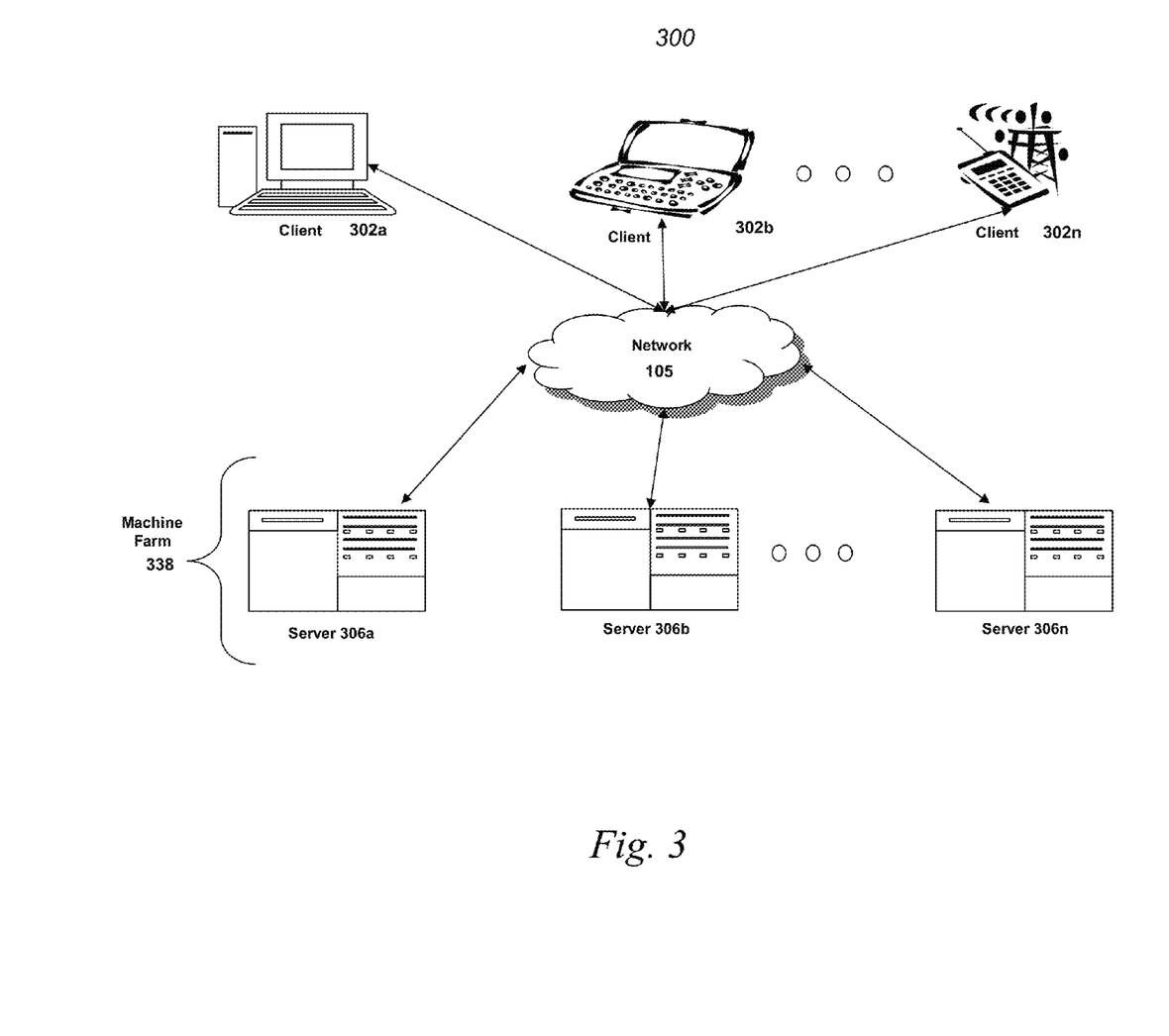
FIG. 3 shows an illustration of an example network environment comprising client machines in communication with remote machines in accordance with an implementation.

The system 100 and its components, such as a data processing system, may include hardware elements, such as one or more processors, logic devices, or circuits. FIG. 3 is an example implementation of a network environment 300. The system 100 and method 200 can operate in the network environment 300 depicted in FIG. 3. In brief overview, the network environment 300 includes one or more clients 302 that can be referred to as local machine(s) 302, client(s) 302, client node(s) 302, client machine(s) 302, client computer(s) 302, client device(s) 302, endpoint(s) 302, or endpoint node(s) 302) in communication with one or more servers 306 that can be referred to as server(s) 306, node 306, or remote machine(s) 306 via one or more networks 105. In some implementations, a client 302 has the capacity to function as both a client node seeking access to resources provided by a server and as a server providing access to hosted resources for other clients 302.

Although FIG. 3 shows a network 105 between the clients 302 and the servers 306, the clients 302 and the servers 306 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the clients 105 and the servers 306. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 306. In one of these implementations, the logical group of servers may be referred to as a server farm 338 or a machine farm 338. In another of these implementations, the servers 306 may be geographically dispersed. In other implementations, a machine farm 338 may be administered as a single entity. In still other implementations, the machine farm 338 includes a plurality of machine farms 338. The servers 306 within each machine farm 338 can be heterogeneous—one or more of the servers 306 or machines 306 can operate according to one type of operating system platform.

In one implementation, servers 306 in the machine farm 338 may be stored in high-density rack systems, along with associated storage systems, and located in an enterprise data center. In this implementation, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 338 do not need to be physically proximate to another server 306 in the same machine farm 338. Thus, the group of servers 306 logically grouped as a machine farm 338 may be interconnected using a wide-area network (WAN) connection or a metropolitan-area network (MAN) connection. For example, a machine farm 338 may include servers 306 physically located in different continents or different regions of a continent, country, state, city, campus, or room. Data transmission speeds between servers 306 in the machine farm 338 can be increased if the servers 306 are connected using a local-area network (LAN) connection or some form of direct connection. Additionally, a heterogeneous machine farm 338 may include one or more servers 306 operating according to a type of operating system, while one or more other servers 306 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 338 may be de-centralized. For example, one or more servers 306 may comprise components, subsystems and circuits to support one or more management services for the machine farm 338. In one of these implementations, one or more servers 306 provide functionality for management of dynamic data, including techniques for handling failover, data replication, and increasing the robustness of the machine farm 338. Each server 306 may communicate with a persistent store and, in some implementations, with a dynamic store.

Server 306 may include a file server, application server, web server, proxy server, appliance, network appliance, gateway, gateway, gateway server, virtualization server, deployment server, secure sockets layer virtual private network ("SSL VPN") server, or firewall. In one implementation, the server 306 may be referred to as a remote machine or a node.

The client 302 and server 306 may be deployed as or executed on any type and form of computing device, such as a computer, network device or appliance capable of communicating on any type and form of network and performing the operations described herein.

Figure 4:
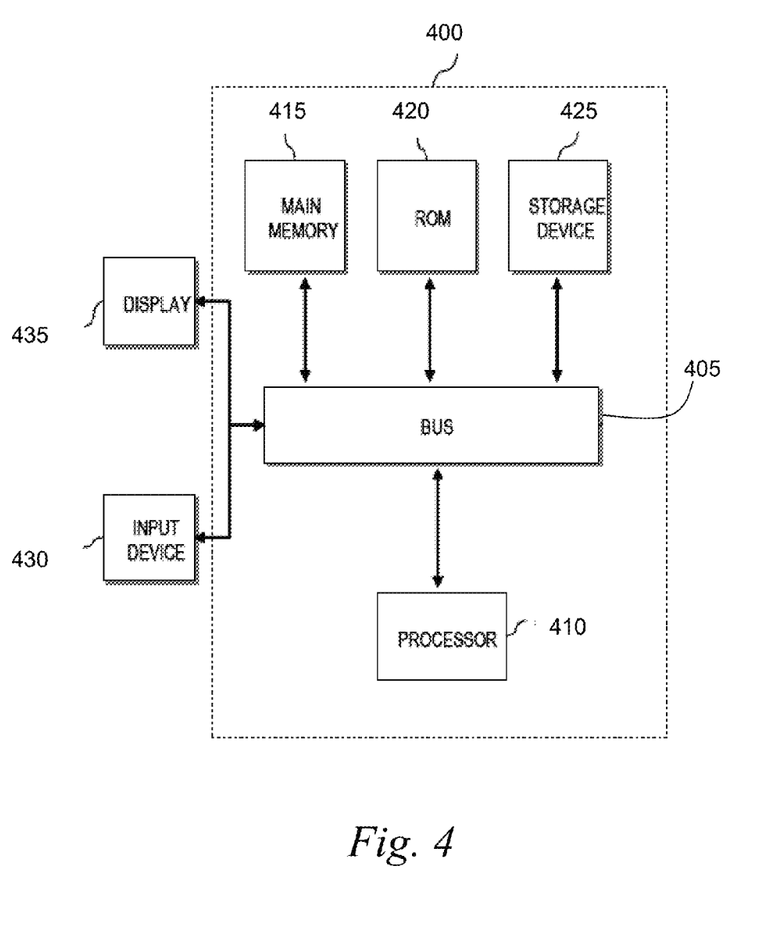
FIG. 4 is a block diagram illustrating a general architecture for a computer system that may be employed to implement various elements of the system shown in FIG. 1 and the method shown in FIG. 2, in accordance with an implementation.

FIG. 4 is a block diagram of a computer system 400 in accordance with an illustrative implementation. The computer system or computing device 400 can be used to implement the system 100, content provider 125, user device 110, web site operator 115, data processing system 120, weighting circuit 130, content selector circuit 135, and database 140. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method of evaluating information via a computer network, comprising:
receiving, by a data processing system via the computer network, an indication of user interest of a first user in a first advertisement displayed on a parked domain web page having a unique identifier, the parked domain web page lacking content having keywords other than content provided via the data processing system, the indication of user interest including at least one of a click, a selection, a finger gesture, a mouse over, and a conversion;
identifying, by the data processing system from a database, a plurality of keywords of the first advertisement using the unique identifier of the parked domain web page;
determining, by the data processing system, for the parked domain web page, a weight of each of the plurality of keywords based on the indication of user interest of the first user in the first advertisement displayed on the parked domain web page, and also based on historic performance on the parked domain web page of each of the plurality of keywords corresponding to user interest of at least one user other than the first user, wherein a first keyword of the plurality of keywords has a first weight on the parked domain web page, and the first keyword has a different weight on a second information resource;
receiving, by the data processing system, an indication of user interest of a second user in a second advertisement displayed on the parked domain web page, the second advertisement associated with a second keyword of the plurality of keywords;
determining, by the data processing system, a second weight of the second keyword based on the indication of user interest of the second user in the second advertisement;
receiving, by the data processing system, for a third user different from the first user and the second user, a request for content to provide for display with the parked domain web page;
ranking, by the data processing system, the first keyword of the plurality of keywords and the second keyword of the plurality of keywords based on the first weight of the first keyword and the second weight of the second keyword to select, based on the first keyword ranking higher than the second keyword, the first keyword as a highest ranked keyword; and
selecting, by the data processing system, a third advertisement to provide for display with the parked domain web page based at least in part on the first keyword selected as the highest ranked keyword, wherein the third advertisement is different from the first advertisement and the second advertisement.

2. The method of claim 1, wherein the third advertisement includes a first content having the first keyword and a second content having the first keyword.

3. The method of claim 1, further comprising:
ranking, for the parked domain web page, the plurality of keywords based on the weight of each of the plurality of keywords; and
wherein the first keyword has a top ranking of the plurality of keywords.

4. The method of claim 1, wherein the plurality of keywords includes the first keyword associated with the first advertisement displayed on the parked domain web page and a third keyword associated with the third advertisement displayed on the parked domain web page.

5. The method of claim 1, further comprising:
receiving an indication of user interest in a fourth advertisement displayed on the parked domain web page, the fourth advertisement associated with the first keyword.

6. The method of claim 1, further comprising:
determining the weight of each of the plurality of keywords based on a characteristic associated with the user interest of the first user in the first advertisement display on the parked domain web page, the characteristic including at least one of a temporal characteristic, a day characteristic, a web page content slot characteristic, a monetary characteristic, and a performance characteristic.

7. The method of claim 1, wherein the user interest of the first user includes the click.

8. The method of claim 1, wherein the weight of each of the plurality of keywords associated with the first advertisement displayed on the parked domain web page is specific to the parked domain web page.

9. The method of claim 1, further comprising:
selecting the second keyword based on the weight of each of the plurality of keywords, wherein the first advertisement is associated with the first keyword and the second keyword.

10. The method of claim 1, further comprising:
assigning the weight to each of the plurality of keywords based on a number of user interactions with corresponding advertisements when the corresponding advertisements were previously displayed on the parked domain web page having the unique identifier.

11. The method of claim 1, further comprising:
receiving the indication of user interaction with the first advertisement displayed on the parked domain web page having the unique identifier, the first advertisement corresponding to the first keyword of the plurality of keywords;
responsive to the indication, increasing a weight of the first keyword of the plurality of keywords by adding a point to the weight; and
associating, in the database, the increased weight of the first keyword of the plurality of keywords with the parked domain web page having the unique identifier.

12. The method of claim 1, further comprising:
responsive to receiving the request for content, accessing the database storing the plurality of keywords and a second plurality of keywords corresponding to advertisements previously displayed on the parked domain web page;
determining, for each of the second plurality of keywords, a weight based on a performance of the corresponding advertisement previously displayed on the parked domain web page having the unique identifier;
comparing, for the parked domain web page, the weight for each of the second plurality of keywords and the plurality of keywords to select a highest weighted keyword, a weight of the highest weighted keyword satisfying the threshold weight; and
using the highest weighted keyword to select the second advertisement to provide for display with the parked domain web page having the unique identifier.

13. A system to evaluate information via a computer network, comprising:
a data processing system having one or more processors and memory, the data processing system configured to:
receive an indication of user interest of a first user in a first advertisement displayed with a parked domain web page having a unique identifier, the parked domain web page lacking content having keywords other than content provided via the data processing system, the indication of user interest including at least one of a click, a selection, a finger gesture, a mouse over, and a conversion;
identify a plurality of keywords associated with the first advertisement using the unique identifier of the parked domain web page;
determine for the parked domain web page, a weight of each of the plurality of keywords based on the indication of user interest of the first user in the first advertisement of the parked domain web page, and also based on historic performance on the parked domain web page of each of the plurality of keywords corresponding to user interest of at least one user other than the first user, wherein a first keyword of the plurality of keywords has a first weight on the parked domain web page, and the first keyword has a different weight on a second information resource;
receive an indication of user interest of a second user in a second advertisement displayed on the parked domain web page, the second advertisement associated with a second keyword of the plurality of keywords;
determine a second weight of the second keyword based on the indication of user interest of the second user in the second advertisement;
receive, for a third user different from the first user and the second user, a request for content to provide for display with the parked domain web page;
rank the first keyword of the plurality of keywords and the second keyword of the plurality of keywords based on the first weight of the first keyword and the second weight of the second keyword to select, based on the first keyword ranking higher than the second keyword, the first keyword as a highest ranked keyword; and
select a third advertisement to provide for display with the parked domain web page based at least in part on the first keyword selected as the highest ranked keyword, wherein the third advertisement is different from the first advertisement and the second advertisement.

14. The system of claim 13, wherein the data processing system is further configured to:
rank, for the parked domain web page, the plurality of keywords based on the weight of each of the plurality of keywords; and
evaluate the plurality of keywords to select the first keyword, wherein the first keyword has a top ranking of the plurality of keywords.

15. The system of claim 13, wherein the plurality of keywords includes the first keyword associated with the first advertisement of the parked domain web page and a third keyword associated with the third advertisement of the parked domain web page.

16. The system of claim 13, wherein the data processing system is further configured to:
receive an indication of user interest in a fourth advertisement of the parked domain web page, the fourth advertisement associated with a third keyword of the plurality of keywords;
determine a third weight of the third keyword; and
identify one of the first keyword and the third keyword as the highest ranked keyword.

17. The system of claim 13, wherein the data processing system is further configured to:
receive the indication of user interest in the first advertisement, the first advertisement associated with the first keyword; and
receive an indication of user interest in a third advertisement, the third advertisement associated with the first keyword.

18. A non-transitory computer readable medium having instructions to evaluate information, the instructions comprising instructions to:

receive an indication of user interest of a first user in a first advertisement displayed with a parked domain web page having a unique identifier, the parked domain web page lacking content having keywords other than content provided via the data processing system, the indication of user interest including at least one of a click, a selection, a finger gesture, a mouse over, and a conversion;

identify a plurality of keywords associated with the first advertisement using the unique identifier of the parked domain web page;

determine for the parked domain web page, a weight of each of the plurality of keywords based on the indication of user interest of the first user in the first advertisement of the parked domain web page, and also based on historic performance on the parked domain web page of each of the plurality of keywords corresponding to user interest of at least one user other than the first user, wherein a first keyword of the plurality of keywords has a first weight on the parked domain web page, and the first keyword has a different weight on a second information resource;

receive an indication of user interest of a second user in a second advertisement displayed on the parked domain web page, the second advertisement associated with a second keyword of the plurality of keywords;

determine a second weight of the second keyword based on the indication of user interest of the second user in the second advertisement;

receive, for a third user different from the first user and the second user, a request for content to provide for display with the parked domain web page;

rank the first keyword of the plurality of keywords and the second keyword of the plurality of keywords based on the first weight of the first keyword and the second weight of the second keyword to select, based on the first keyword ranking higher than the second keyword, the first keyword as a highest ranked keyword; and select a third advertisement to provide for display with the parked domain web page based at least in part on the first keyword selected as the highest ranked keyword, wherein the third advertisement is different from the first advertisement and the second advertisement.

19. The non-transitory computer readable medium of claim 18, wherein the weight of each of the plurality of keywords is specific to the parked domain web page.

* * * * *